United States Patent
Henke et al.

(10) Patent No.: US 10,632,523 B2
(45) Date of Patent: Apr. 28, 2020

(54) SELF-PIERCING RIVET DIE

(71) Applicant: BÖLLHOFF VERBINDUNGSTECHNIK GmbH, Bielefeld (DE)

(72) Inventors: Dennis Henke, Rheda-Wiedenbrück (DE); Daniel Junklewitz, Paderborn (DE); Andreas Marxkors, Hövelhof (DE); Franz Ferdinand Menne, Bad Lippspringe (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 16/081,796

(22) PCT Filed: Feb. 10, 2017

(86) PCT No.: PCT/EP2017/053004
§ 371 (c)(1),
(2) Date: Aug. 31, 2018

(87) PCT Pub. No.: WO2017/148684
PCT Pub. Date: Sep. 8, 2017

(65) Prior Publication Data
US 2019/0084032 A1 Mar. 21, 2019

(30) Foreign Application Priority Data
Mar. 4, 2016 (DE) ........................ 10 2016 103 999

(51) Int. Cl.
*B21J 15/36* (2006.01)
*B21J 15/02* (2006.01)
(Continued)

(52) U.S. Cl.
CPC ............. *B21J 15/36* (2013.01); *B21J 15/025* (2013.01); *F16B 19/086* (2013.01); *F16B 19/10* (2013.01)

(58) Field of Classification Search
CPC .......... B21J 15/36; B21J 15/025; B21J 15/04; F16B 19/086; F16B 19/10
See application file for complete search history.

(56) References Cited

U.S. PATENT DOCUMENTS 4,555,838 A * 12/1985 Muller .................. B23P 19/062
227/55
5,140,735 A * 8/1992 Ladouceur ............ B23P 19/062
29/243.522
(Continued)

FOREIGN PATENT DOCUMENTS

| CN | 201940487 U | 8/2011 |
| DE | 3447006 C2 | 6/1988 |

(Continued)

OTHER PUBLICATIONS

Written Opinion & International Search Report for PCT/EP2017/053004 dated Apr. 12, 2017, 10 pages.
(Continued)

*Primary Examiner* — Bayan Salone
(74) *Attorney, Agent, or Firm* — Reising Ethington P.C.

(57) ABSTRACT

A self-piercing riveting die for a setting device, by which a self-piercing riveting connection in a plurality of components is establishable by forming a closing head. This self-piercing riveting die may include a main body with an upper side and a recess arranged rotationally symmetrically to the central axis of the self-piercing riveting die formed therein. In the cross-section of the self-piercing riveting die, the recess has a demolding inclination of the demolding section, which radially transitions via a step into a circular arc-shaped lowering of the annular channel section, wherein
(Continued)

Figure 1:
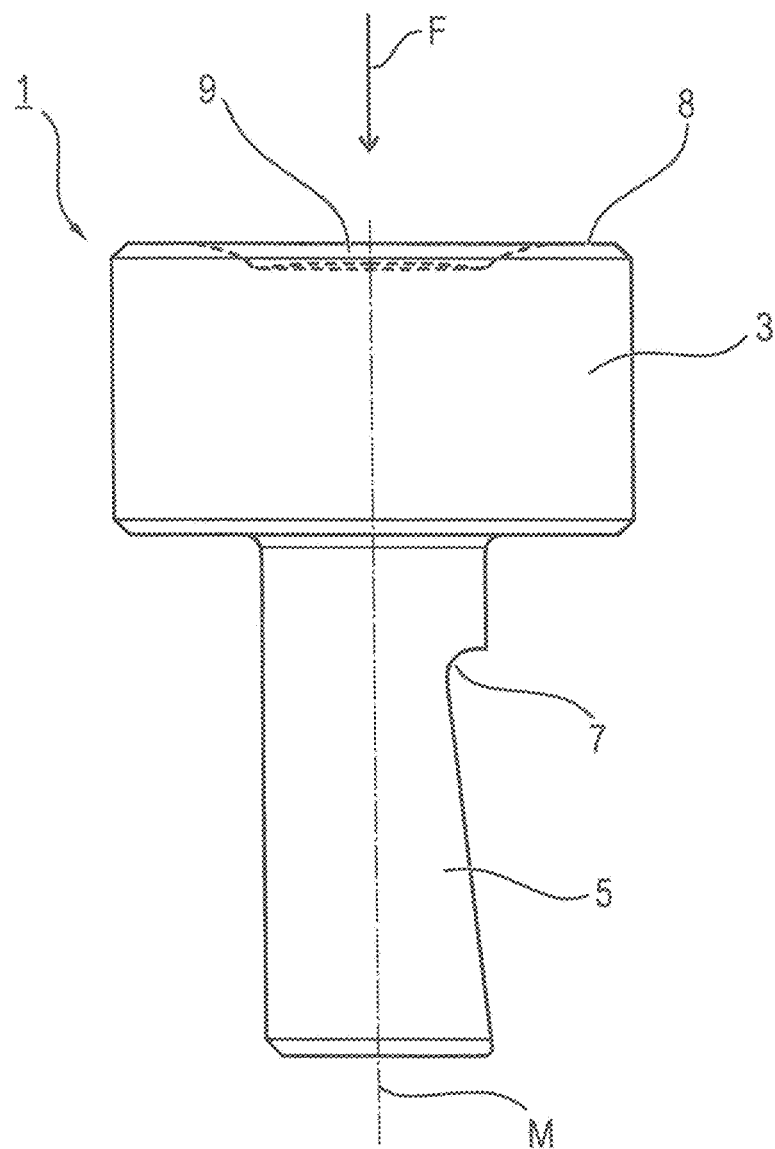

the circular arc-shaped lowering radially inwardly rises straight-lined or circular arc-shaped or curvilinearally to the die bottom.

20 Claims, 22 Drawing Sheets

(51) Int. Cl.
*F16B 19/08* (2006.01)
*F16B 19/10* (2006.01)

(56) References Cited

U.S. PATENT DOCUMENTS

| | | | |
|---|---|---|---|
| 5,174,018 A | 12/1992 | Muller | |
| 6,546,613 B2 * | 4/2003 | Donovan | B21J 15/025 29/243.53 |
| 6,883,223 B2 * | 4/2005 | Edwards | B21J 15/025 29/428 |
| 7,179,034 B2 | 2/2007 | Ladouceur | |
| 7,284,319 B2 | 10/2007 | Kato et al. | |
| 8,506,228 B2 | 8/2013 | Singh et al. | |
| 8,763,233 B2 | 7/2014 | Bartig | |
| 9,091,290 B2 | 7/2015 | Singh et al. | |
| 9,352,377 B2 | 5/2016 | Smeyers | |
| 9,919,356 B2 | 3/2018 | Bartig et al. | |
| 2003/0046804 A1 | 3/2003 | Donovan | |
| 2004/0168297 A1 * | 9/2004 | Nishimura | B21D 39/031 29/521 |
| 2013/0160262 A1 | 6/2013 | Furukawa | |

FOREIGN PATENT DOCUMENTS

| | | |
|---|---|---|
| DE | 4404659 A1 | 8/1995 |
| DE | 4404659 B4 | 12/2004 |
| DE | 102006028537 B3 | 5/2007 |
| DE | 60310121 T2 | 10/2007 |
| DE | 19905528 B4 | 12/2007 |
| DE | 102009039936 A1 | 4/2011 |
| DE | 112012003904 T5 | 7/2014 |
| EP | 1078701 A2 | 2/2001 |
| EP | 1294504 B1 | 9/2004 |
| EP | 2606993 B1 | 7/2014 |
| JP | 2003230935 A | 8/2003 |
| JP | 2013130238 A | 7/2013 |
| JP | 2015529562 A | 10/2015 |
| WO | WO03020457 A1 | 3/2003 |
| WO | WO2014009129 A1 | 1/2014 |

OTHER PUBLICATIONS

English translation of the International Preliminary Report on Patentability for PCT/EP2017/053004 dated Sep. 1, 2018, (6 pages).

CN Office Action for CN Application No. 201780015072.5 dated Sep. 9, 2019 (9 pages).

JP Office Action for JP Application No. 2018-545295 dated Aug. 27, 2019 (10 pages).

* cited by examiner

SELF-PIERCING RIVET DIE

1. TECHNICAL FIELD

The present disclosure is related to a self-piercing riveting die for setting a self-piercing rivet in at least a first and a second component, a setting device in combination with this self-piercing riveting die, the connection between at least two components established by means of this self-piercing riveting die, and a method for establishing such a connection.

2. BACKGROUND

In the prior art, the connecting of at least a first and a second component by means of a self-piercing rivet is known. For this purpose, a self-piercing rivet is driven into the at least two components by means of a setting device, wherein the at least two components are supported at a die arranged opposite to the punch. Due to its shape, this die affects the features of the joint connection.

For example, DE 199 05 528 B4 discloses an anvil die. This anvil die is characterized by a plane surface, which serves as a counter-bearing for supporting the components to be connected. A die formed in such manner provides an aesthetically appealing surface on the side of the joint connection opposite to the self-piercing rivet. This is advantageous especially for visible self-piercing riveting connections. It is disadvantageous, however, that the material of the components displaced by the self-piercing rivet cannot escape into a die cavity. This leads to the self-piercing rivet being compressed and spread stronger than during a usual self-piercing riveting process. This stresses the material of the components and thus the whole joint connection. Additionally, the plane anvil die causes a stronger spreading of the self-piercing rivet, which leads to higher compressive stress in the material of the components. Also, this additional compressive stress can shorten the lifespan of the established connection.

In DE 10 2009 039 936 A1, a die for establishing a self-piercing riveting connection is used, which shows an angular die cavity with a central recess. Especially the angular embodiment of this self-piercing riveting die causes an inconsistent flow of material during the riveting process. This leads to an uncoordinated material distribution within the die cavity. As a consequence, the die cavity is filled unevenly with material of the die-sided component, so that the formed closing head does not enclose the spreaded rivet shaft uniformly.

EP 1 078 701 A2 and EP 2 606 993 B1 propose a self-piercing riveting die having a spherical segment shaped recess for establishing a reliable self-piercing riveting connection. This self-piercing riveting die is especially suitable for more ductile material, e.g. aluminum, to a sheet thickness of up to 1.5 mm. Even if the evenly formed spherical segment shaped supports a consistent flow of material during the riveting process, a missing spreading of the self-piercing rivet and a possible compressing of the self-piercing rivet was found. These processes shorten the lifespan of the established connection.

In vehicle construction, components made of magnesium and aluminum are used more and more frequently. Due to their reduced weight, when compared to e.g. steel material, these components contribute to a reduction of the vehicle weight and thus of the fuel consumption. If, however, connections between components made of these materials are established, e.g. between components made from aluminum of the 7000 series, these connections are frequently affected by negative crack formation. DE 11 2012 003 904 T5 therefore suggests a suitable thermal treatment for self-piercing riveting connections of such materials. Although the thermal treatment described here can reduce crack formation, it increases the effort for establishing such connections. Hence, an aim of the present disclosure is to suggest a suitably formed self-piercing riveting die, which makes an additional thermal treatment unnecessary, even when establishing a self-piercing riveting connection of brittle materials, e.g. aluminum of the 7000 series or aluminum alloys.

DE 44 04 659 A1 describes another elaborate method for establishing a self-piercing riveting connection. Here, the main objective is to establish a liquid-tight self-piercing riveting connection between two components. In this way, cracking formations caused by the self-piercing rivet to be set should be avoided. For this reason, both components to be connected to each other are preformed into a form complementary to the self-piercing rivet as a preparation for establishing a self-piercing riveting connection. This objective is achieved by means of a punch, which engages in a self-piercing riveting die, the die cavity of which is formed by an annular recess for the rivet shaft and a central bump for the cavity in the rivet shaft. In this way, the spreading of the half-hollow self-piercing rivet during the riveting process is reduced. Further, the pressure of the rivet shaft on the punch-side component is reduced, so that the rivet shaft does not cut through the sheet layer facing the punch during the riveting process. In this way, the actual riveting process is limited by the depth of the die which is adjusted to the length of the rivet shaft. The sufficiently large die cavity is adjusted to the self-piercing rivet and does not provide an adequate counterforce to the self-piercing rivet, which leads to a compressing of the self-piercing rivet and to the forming of a sufficient undercut.

WO 2014/009129 A1 discloses a self-piercing riveting die which uses an annular blockade in the die cavity for the flow of material. This annular blockade is intended to prevent the material of the die-sided component from flowing radially outwards as soon as it is pushed against the floor of the die cavity. In this way, it should be ensured that, after the connection is established, a sufficient remaining material thickness below the self-piercing rivet is provided. Further, the material jam within the material flow blockade should ensure that the material strength counteracting against the self-piercing rivet is providing a sufficient spreading of the rivet shaft. As the flow of material is blocked by the annular material flow blockade as well as the almost perpendicular towering side walls of the die, only an uncoordinated distribution of the material takes place inside the die cavity, this supporting an uneven realization of connecting forces within the self-piercing riveting connection to be established. Also, providing a central recess within the die cavity only marginally improves the flow of material during the establishing of the self-piercing riveting connection. Especially when this recess is used in combination with the annular material flow blockade, a kind of shielding of the radial outer die cavity is created, until the volume of the central recess and the annular material flow blockade is filled with displaced material of the component facing the die. Only afterwards the material flows in the remaining die cavity. This gradual forming of the closing head within the die cavity requires a sufficiently large filling volume for the die cavity, especially with brittle material. Often, this is not fulfilled, causing a weakening of the self-piercing riveting connection.

EP 1 294 504 B1 describes a self-piercing riveting die, in which exceeding material from the die cavity can drain off. This is realized, for example, by an opening to the die cavity making a drain of the component material possible. The displaced component material drained in this way prevents a material jam in the die cavity to cause a collapse of the set self-piercing rivet. At the same time it is prevented, by the drained material with missing exact adjustment with the die cavity, that a sufficient counter-pressure of the exceeding material leads to a reliable spreading and thus a permanent connection between the both components.

It is therefore an object of at least some embodiments of the present invention to propose a self-piercing riveting die, which overcomes disadvantages present in the prior art and which allows to establish a reliable self-piercing riveting connection with a long lifespan. Additionally, it is a further object of at least some embodiments of the present invention to provide a respective punch riveting connection, a setting device having such a punch riveting die as well as a method for making such a connection.

3. SUMMARY

The above object is solved in at least some embodiments by a self-piercing riveting die, a setting device, a connection as well as a method for self-piercing riveting. Further embodiments and further developments of the present invention will become apparent from the following description, the accompanying drawings and the appending claims.

The self-piercing riveting die for a setting device by means of which a self-piercing riveting connection is establishable in a plurality of components while forming a closing head, comprises the following features: a main body, preferably a cylindrical main body, having an upper side and a recess arranged rotationally symmetrically to the central axis of the self-piercing riveting die formed therein, the recess having a diameter $D_M$ at the upper side, wherein the recess comprises an annular demolding section arranged radially outwardly, a subsequent or adjacent annular channel section and a centrally arranged die bottom, wherein in a cross section of the self-piercing riveting die extending parallel to the central axis a demolding inclination of the demolding section encloses with the upper side of the self-piercing riveting die an angle $\alpha$ in the range of $5° \leq \alpha \leq 45°$, the demolding inclination transitioning radially inwardly over a step into a circular arc-shaped lowering of the annular channel section with a radius $R_S$ in a range of $8.2/1000\ D_M \leq R_S \leq 8.2/100\ D_M$, and radially inwardly the circular arc-shaped lowering rising straight-lined or circular arc-shaped to the die bottom.

The above-described shape of the self-piercing riveting die positively effects the flow of material of the die-sided component during the riveting process in order to form a suitable closing head for the riveting connection. Thereby, the predefined shape of the self-piercing riveting die provides a defined spreading of the self-piercing rivet and at the same time reduces the mechanical tensions inside the rivet foot. This is achieved especially by the annular channel section providing material-receiving spaces for load relief of the rivet foot area. Further, smooth transitions between the annular channel section and the annular demolding section ensure a consistent flow of material, which supports a reliable closing head forming.

According to a first embodiment of the self-piercing riveting die, the demolding inclination is formed linearly. According to another embodiment, the demolding inclination has a concave circular-arc shape with a radius $R_{ES}$ in the range of $7/10\ D_M \leq R_{ES} \leq 9/10\ D_M$. Due to the before-mentioned smooth and barrier-free transition between the annular demolding section and the subsequent or adjacent annular channel section, the material displaced into the recess of the self-piercing riveting die is not accumulated. This material of the die-sided component can move itself in the provided open spaces so that the self-piercing rivet is consistently spread during the riveting process. According to another embodiment, the circular arc-shaped lowering of the self-piercing riveting die has a maximal depth $T_{RK}$ with regard to the upper side of the self-piercing riveting die in the range of $6/100\ D_M \leq T_{RK} \leq 12/100\ D_M$. Depending on the material of the die-sided component, the depth of the lowering in the annular gap section is variably adjustable. In this way, an aim can be put on a specific material behavior, e.g. on brittle materials, in order to prevent crack formation in the closing head. According to the disclosure, brittle materials have an elongation at failure below 15%. Such materials include magnesium-die-casting-alloys, well quenched and tempered steels with a strength over 900 MPa or aluminum-copper-alloys of the 200 series as well as aluminum-zinc-alloys of the 7000 series, among other examples.

Further, the demolding inclination transitions in a convex step into the lowering of the annular channel section. According to the disclosure, it may be also preferred that the lowering of the annular channel section transitions in a convex step into the die bottom. It has been shown that especially the prevention of angular transitions supports the flow of material within the recess of the self-piercing riveting die. Therefore, curvilinearly shaped transitions provide the preferred connection between the demolding inclination and the lowering as well as between the lowering and the die bottom. In this way it is also avoided that a flow of material at an angle between demolding inclination and lowering blocks the flow of material, which could lead to an unpredictable compressing of the self-piercing rivet during the riveting process.

According to another embodiment of the self-piercing riveting die, the circular arc-shaped lowering transitions in two adjacent transition points tangentially into the adjacent convex steps. By a radial distance $A_{UP}$ between the adjacent transition points, a width of the circular arc-shaped lowering of the annular channel section is defined. This width of the circular arc-shaped lowering is preferably in the range of $3/100\ D_M \leq A_{UP} \leq 20/100\ D_M$. It also follows from above definition that the recess of the self-piercing riveting die may be defined by a steadily consistent wall course. Thereby, in addition to the depth of the lowering of the annular channel section, the width of the lowering of the annular channel section is also adjustable to the respective choice of material of the die-sided component. Accordingly, the volume receivable by the recess of the self-piercing riveting die is specifically designed at least in consideration of the material properties of the die-sided component.

According to another embodiment, the die bottom includes a centered recess with a depth $T_A$ in the range of $2/100\ D_M \leq T_A \leq 8/100\ D_M$ and with a diameter $D_A$ which may be in the range of $15/100\ D_M \leq D_A \leq 35/100\ D_M$. This design of the die bottom gives a further opportunity to specifically adjust the material volume of the die-sided component which is to be received by the recess of the self-piercing riveting die. Additionally, by means of the design of the centered recess in the die bottom, also the flow behavior of the material and thus the forming of the closing head is effected.

According to different embodiments, the inner contour or the inner shape of the centered recess is formed differently.

According to a first alternative, the centered recess is formed cylindrically. Another embodiment suggests to provide the centered recess with a central rise or an additional conically tapered sinking. It may be preferred to form the floor of the centered recess with an additional annular gap including circular arc-shaped rise or a semi-elliptical rise. According to a further preferred embodiment of the centered recess, the latter is conically tapered in depth direction.

The present disclosure further comprises a self-piercing riveting die for a setting device, with which a self-piercing riveting connection is establishable in a plurality of components by forming a closing head. This self-piercing riveting die comprises the following features: a main body, preferably a cylindrical main body, having an upper side and a recess arranged rotationally symmetrically to the central axis of the self-piercing riveting die formed therein, the recess having a diameter $D_M$ at the upper side, wherein the recess comprises an annular demolding section arranged radially outwardly, a subsequent or adjacent annular channel section and a centrally arranged die bottom, wherein in a cross section of the self-piercing riveting die extending parallel to the central axis a demolding inclination of the demolding section encloses with the upper side of the self-piercing riveting die an angle $\propto$ in the range of $10°\leq\propto\leq85°$, the demolding inclination transitioning radially inwardly into a circular arc-shaped lowering of the annular channel section with a radius $R_S$ in a range of $8.2/1000\ D_M \leq R_S \leq 8.2/100\ D_M$, and radially inwardly the circular arc-shaped lowering rising circular arc-shaped to the die bottom.

It has been shown that especially with this embodiment, the spreading behavior of a half-hollow self-piercing rivet for creating an increased undercut can be effected. Thereby, the rivet foot is deformed radially outwardly by means of a combination of the annular gap section and the die bottom.

In this regard it may be preferred that the die bottom comprises a centrally arranged, rotationally symmetric rise formed curvilinearally, circularly, semi-elliptically or cylindrically. According to the disclosure, this centrally arranged, rotationally symmetric rise preferably ensures the necessary material jam or accumulation, with the help of which the die foot is deformed radially outwardly for creating a suitable undercut.

The present disclosure further comprises a setting device with a self-piercing riveting die according to the above-described embodiments. Furthermore, the present disclosure comprises a connection between at least a first component and a second component, which is established by means of a self-piercing rivet and the above-described self-piercing riveting die, so that a closing head characterizing the connection is having complementary shape features with regard to the self-piercing riveting die. According to a further embodiment, the second component adjacent to the closing head consists of a sensitive and brittle material, may be of an aluminum alloy of the 7000 series.

The present disclosure describes a self-piercing riveting method for establishing a connection between at least a first and a second component by means of a self-piercing rivet, a setting device and a self-piercing riveting die according to one of the above-described embodiments. The self-piercing riveting method comprises the following steps: providing a self-piercing riveting die below a punch of the setting device, arranging the first and the second component between the self-piercing riveting die and the punch and setting a self-piercing rivet in the first and the second component while simultaneously forming a closing head, which shows shape features complementary to the inner contour of the self-piercing riveting die.

4. BRIEF DESCRIPTION OF THE ACCOMPANYING

Figure 2:
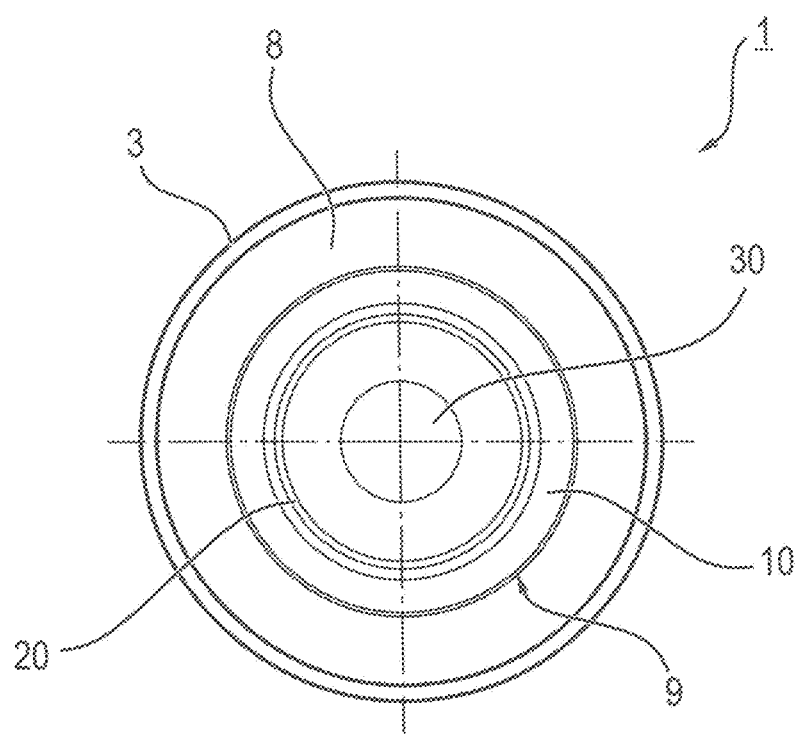
Figure 3:
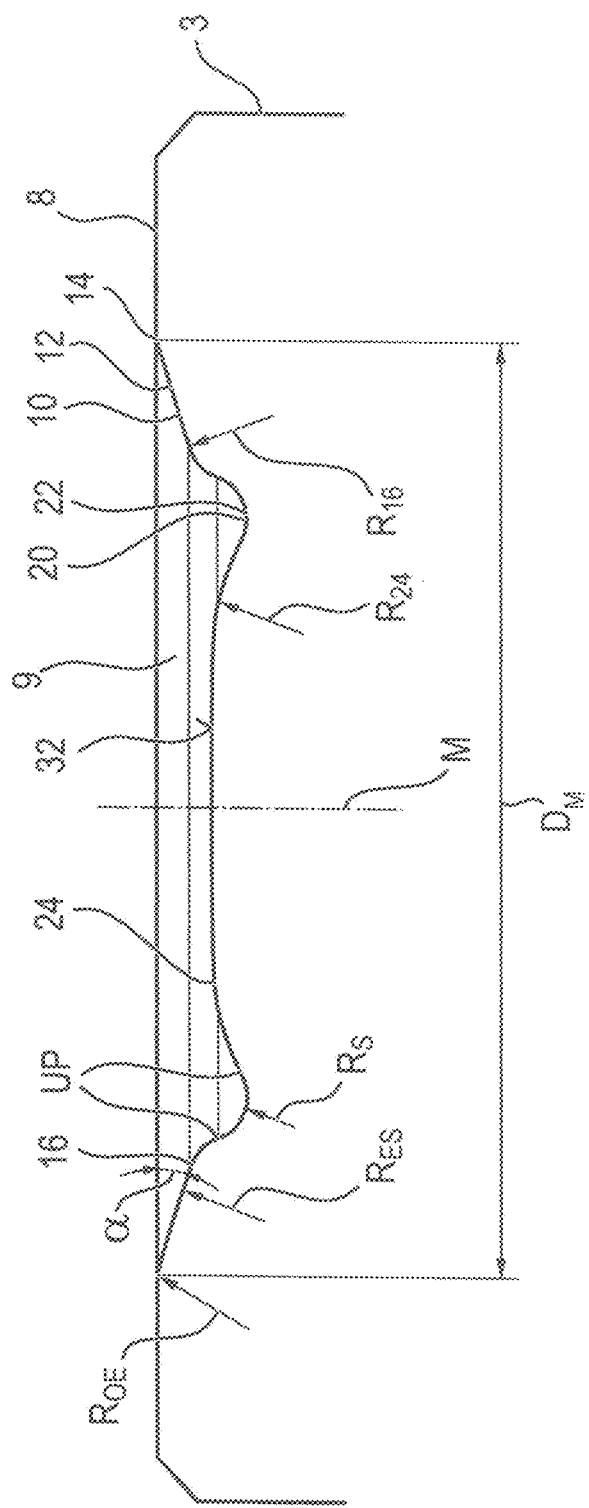
Figure 4:
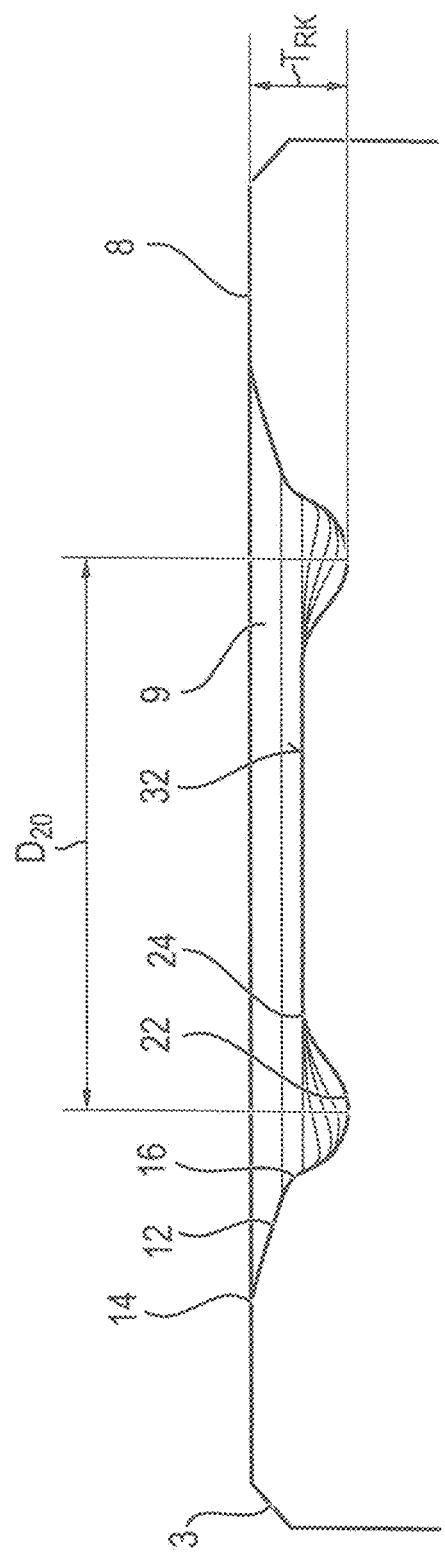
Figure 5:
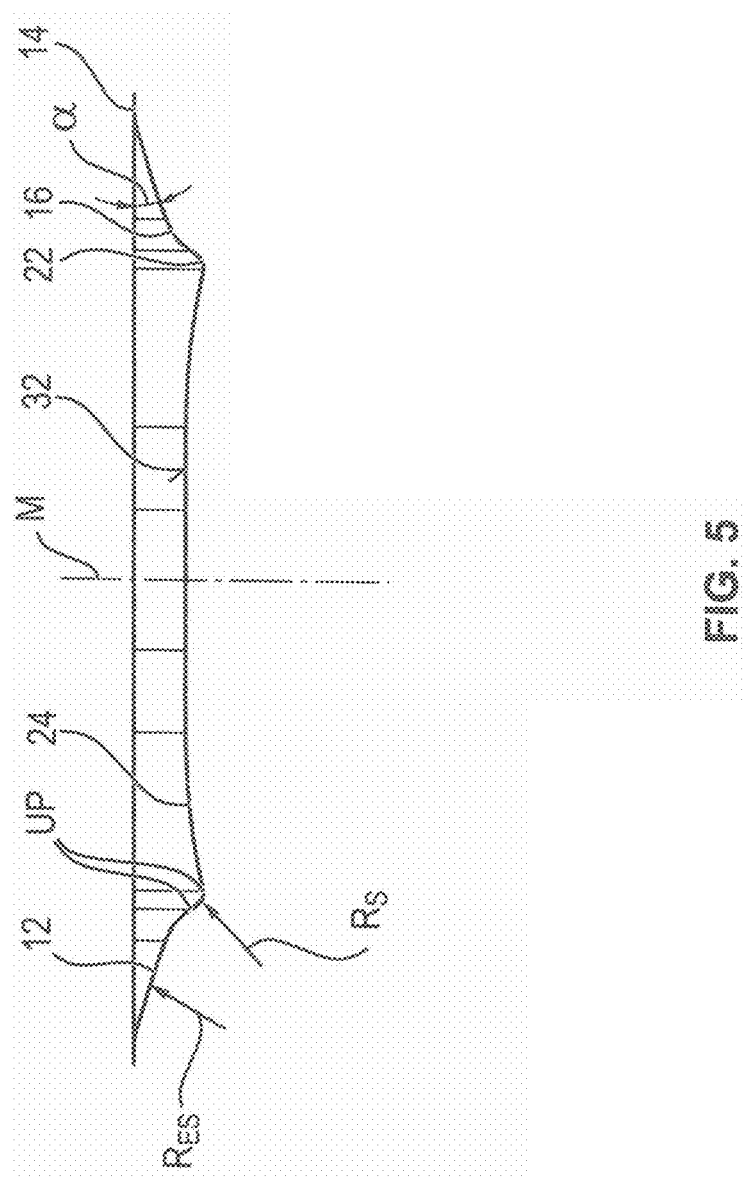
Figure 6:
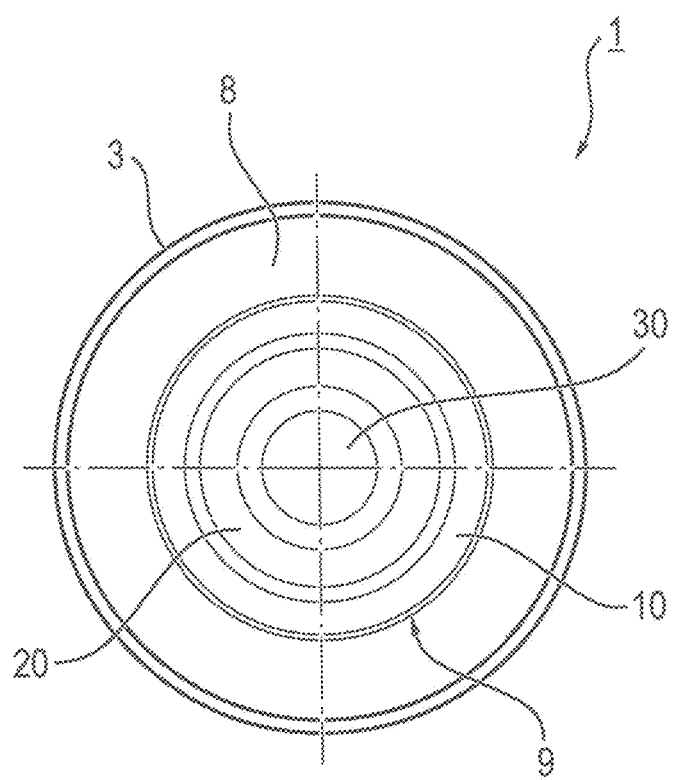
Figure 7:
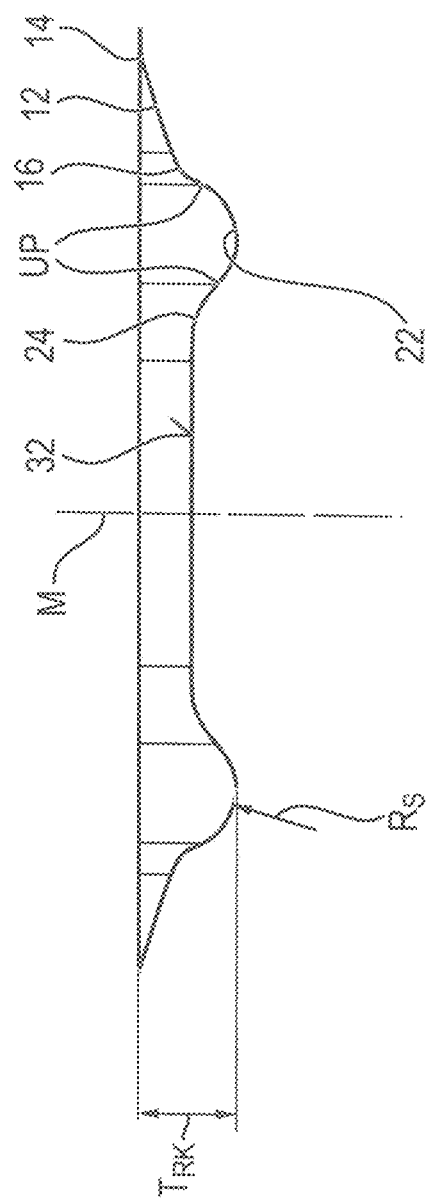
Figure 8:
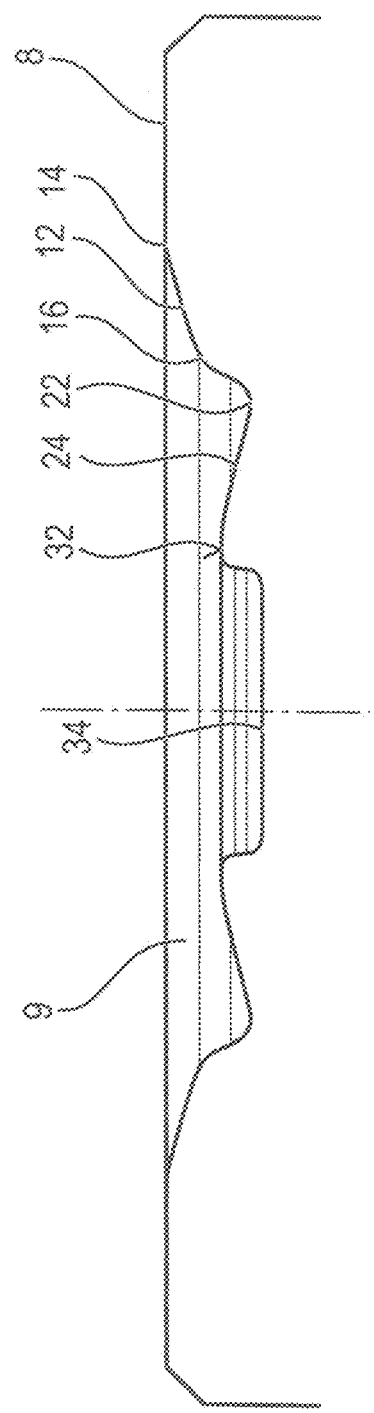
Figure 9:
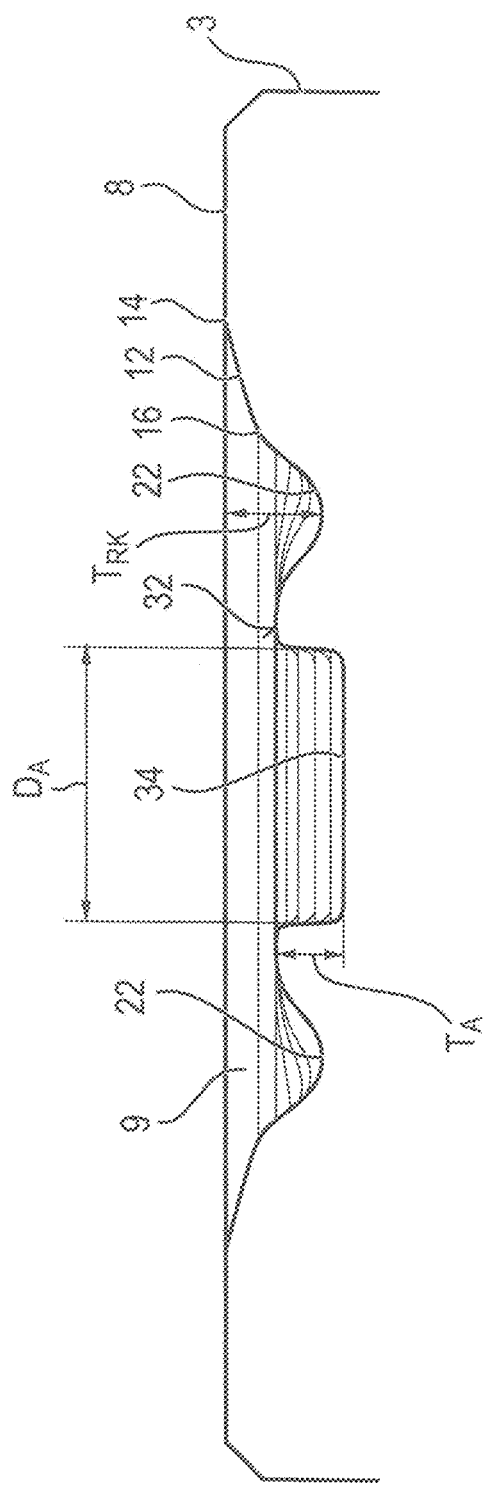
Figure 10:
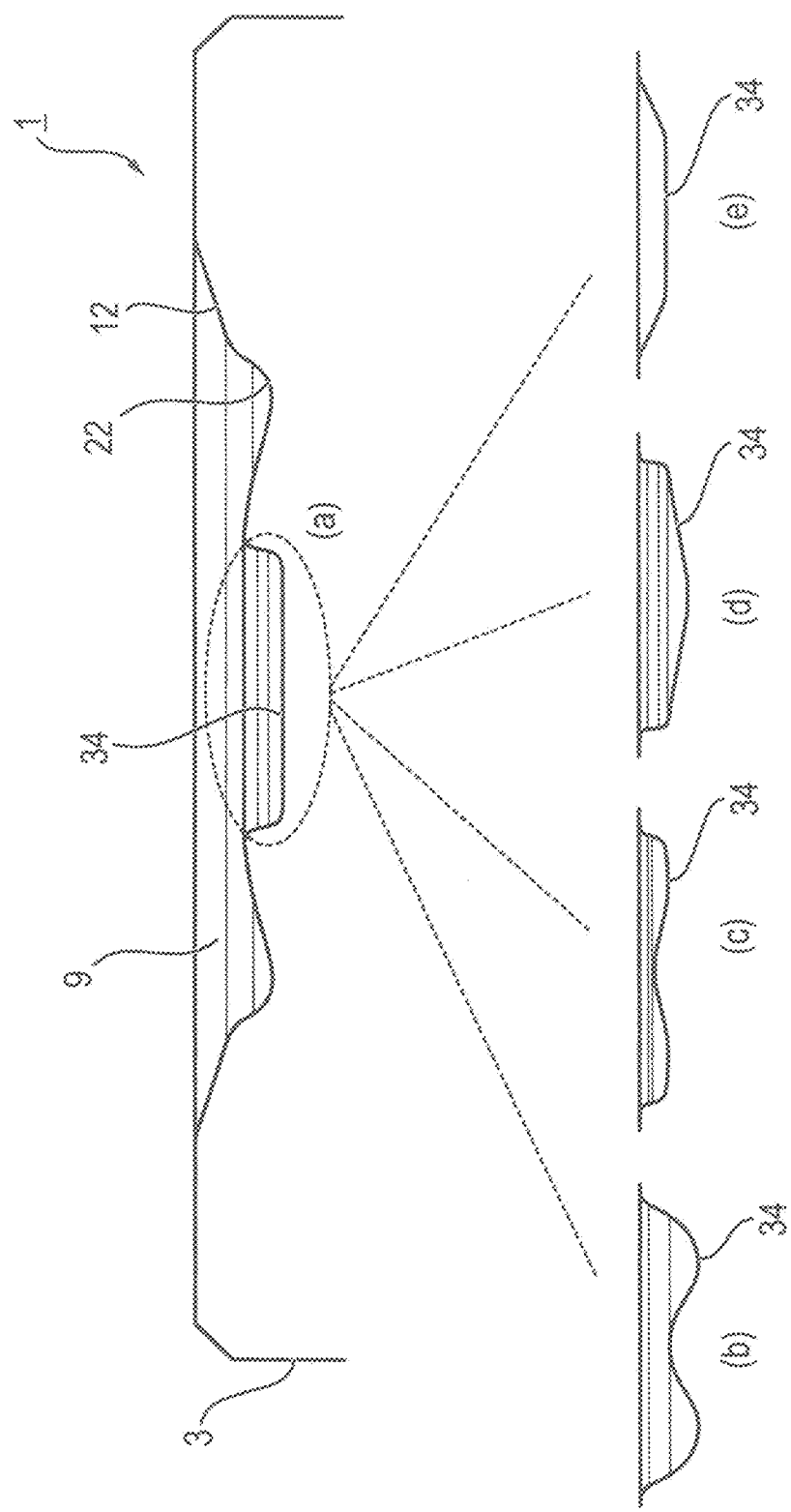
Figure 11:
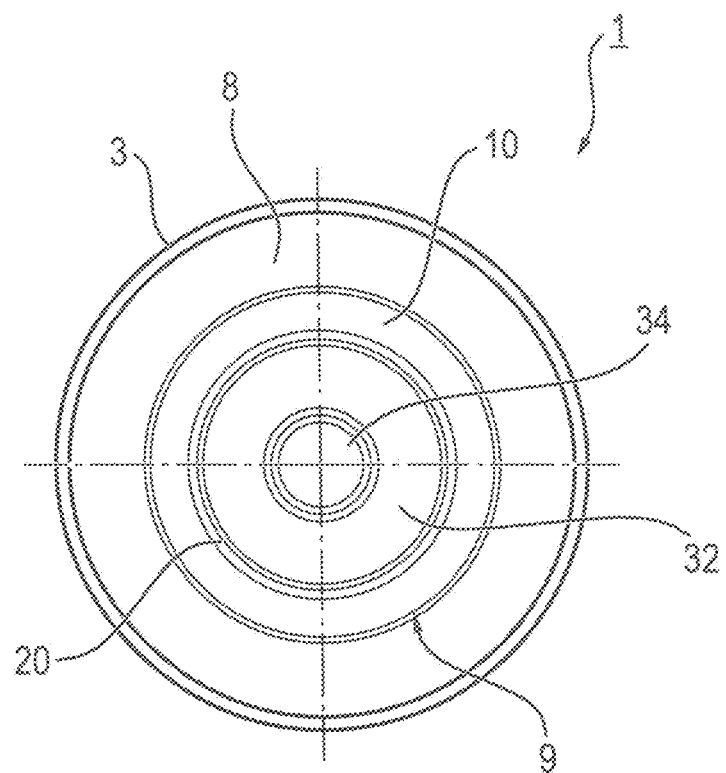
Figure 12:
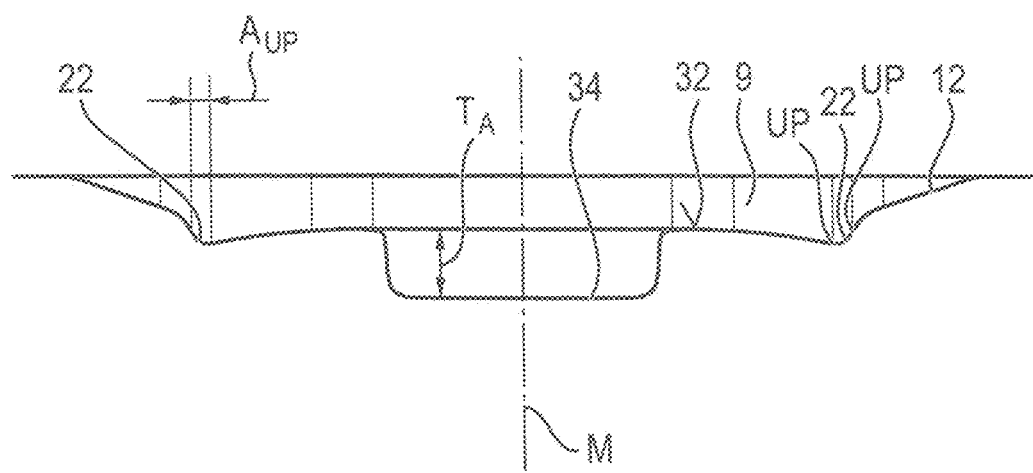
Figure 13:
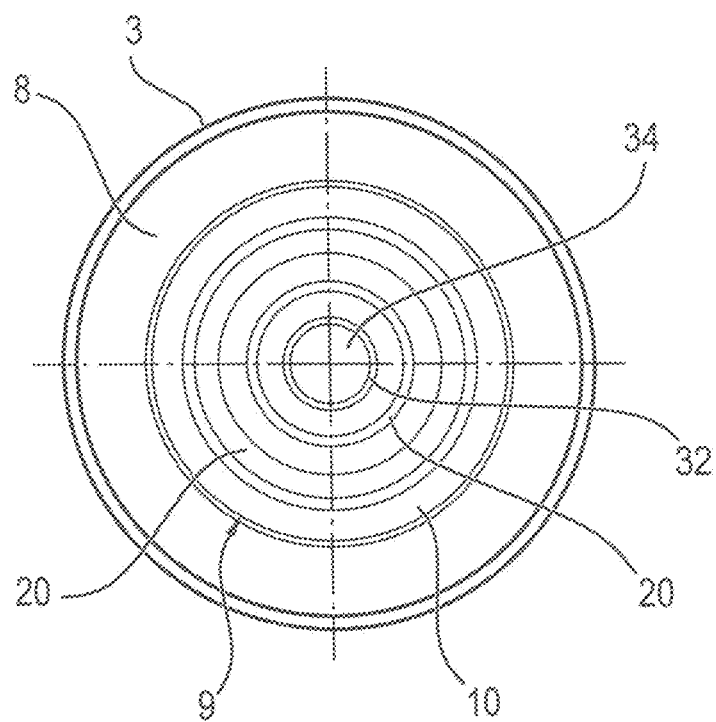
Figure 14:
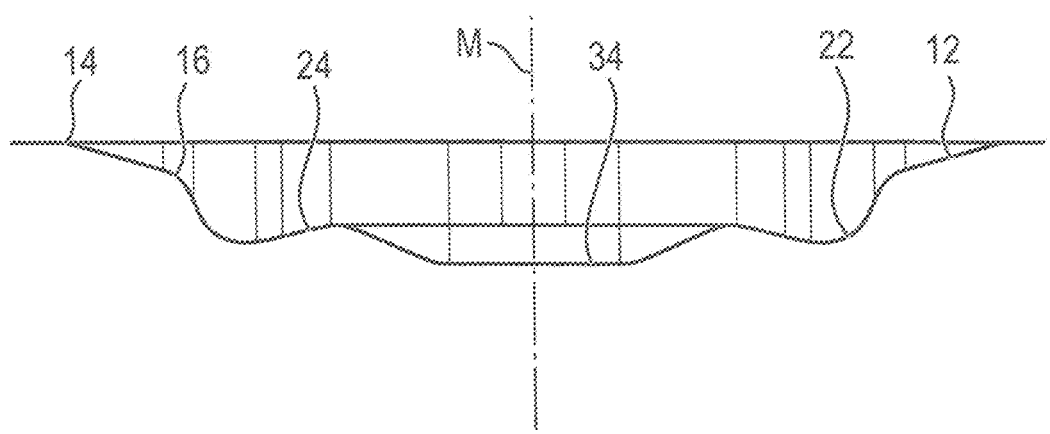
Figure 15:
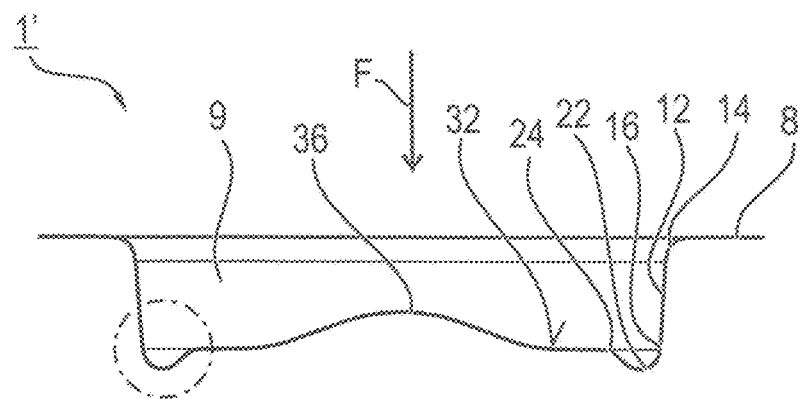
Figure 16:
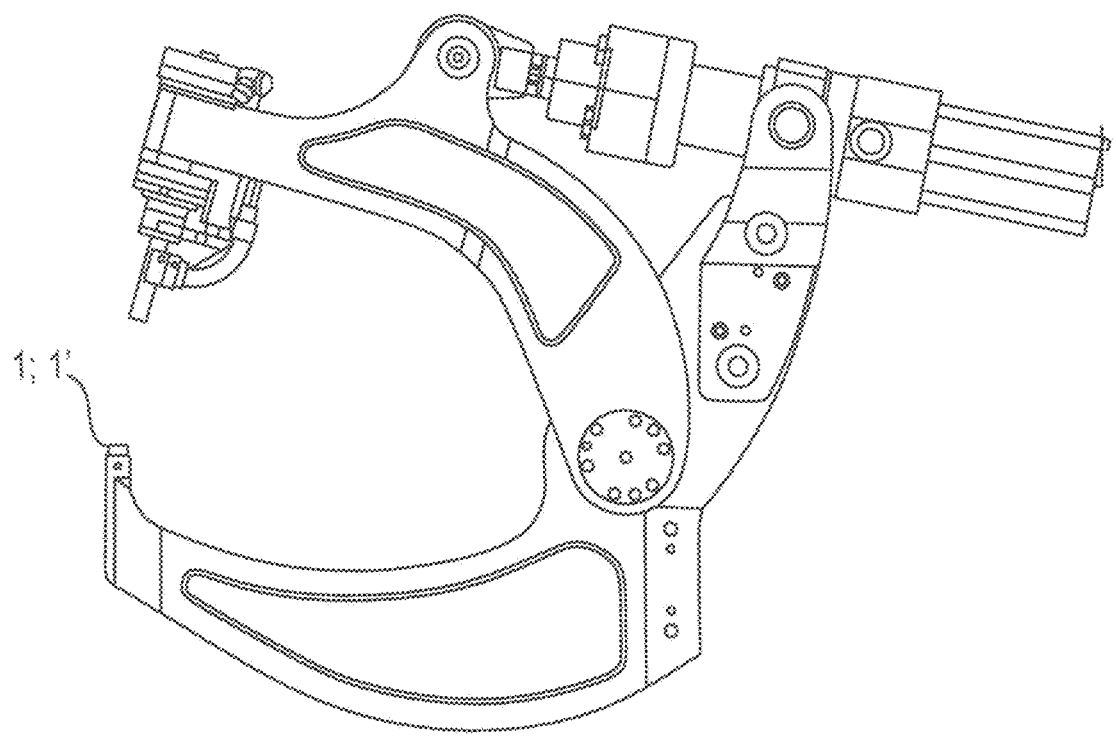
Figure 17A:
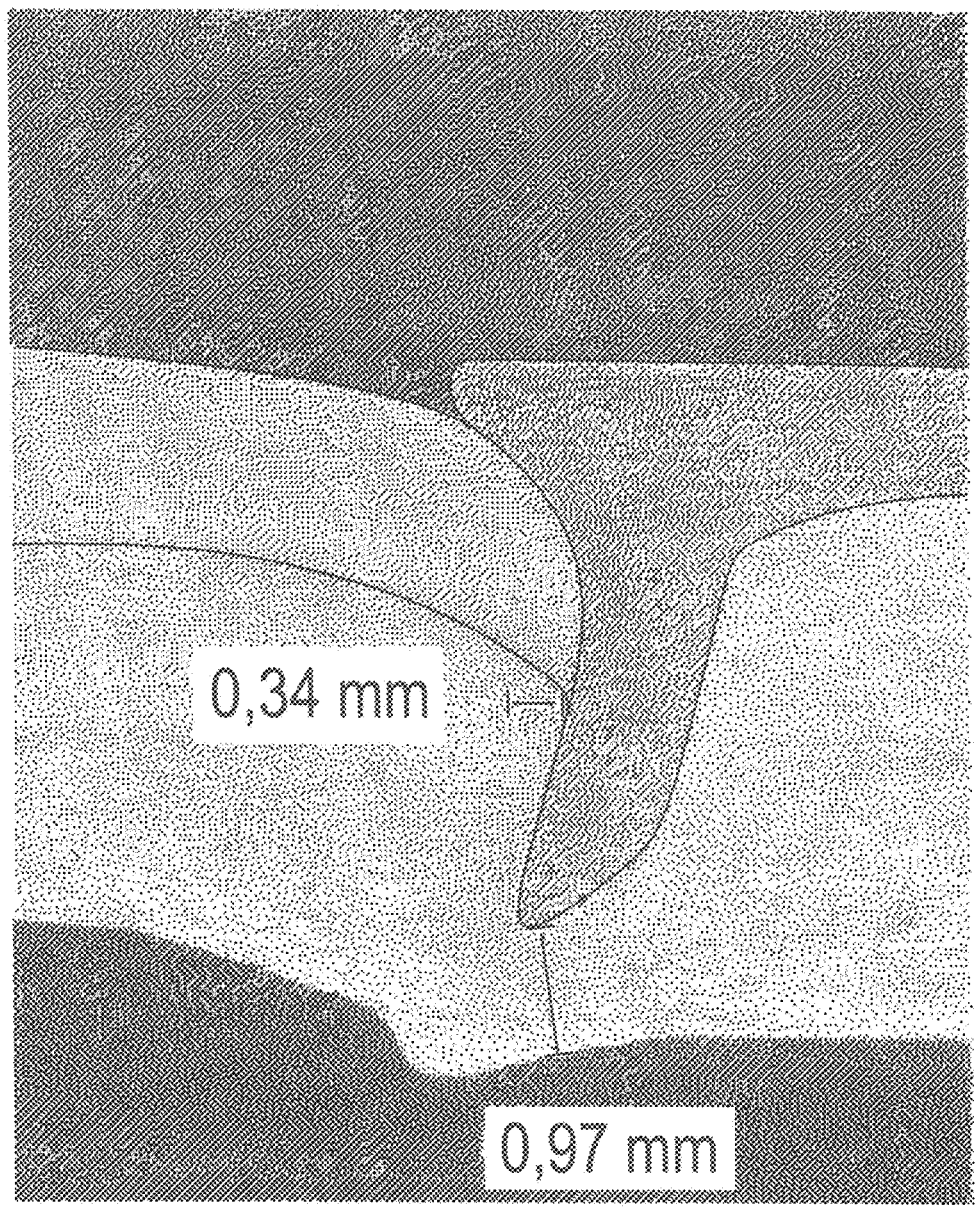
Figure 17B:
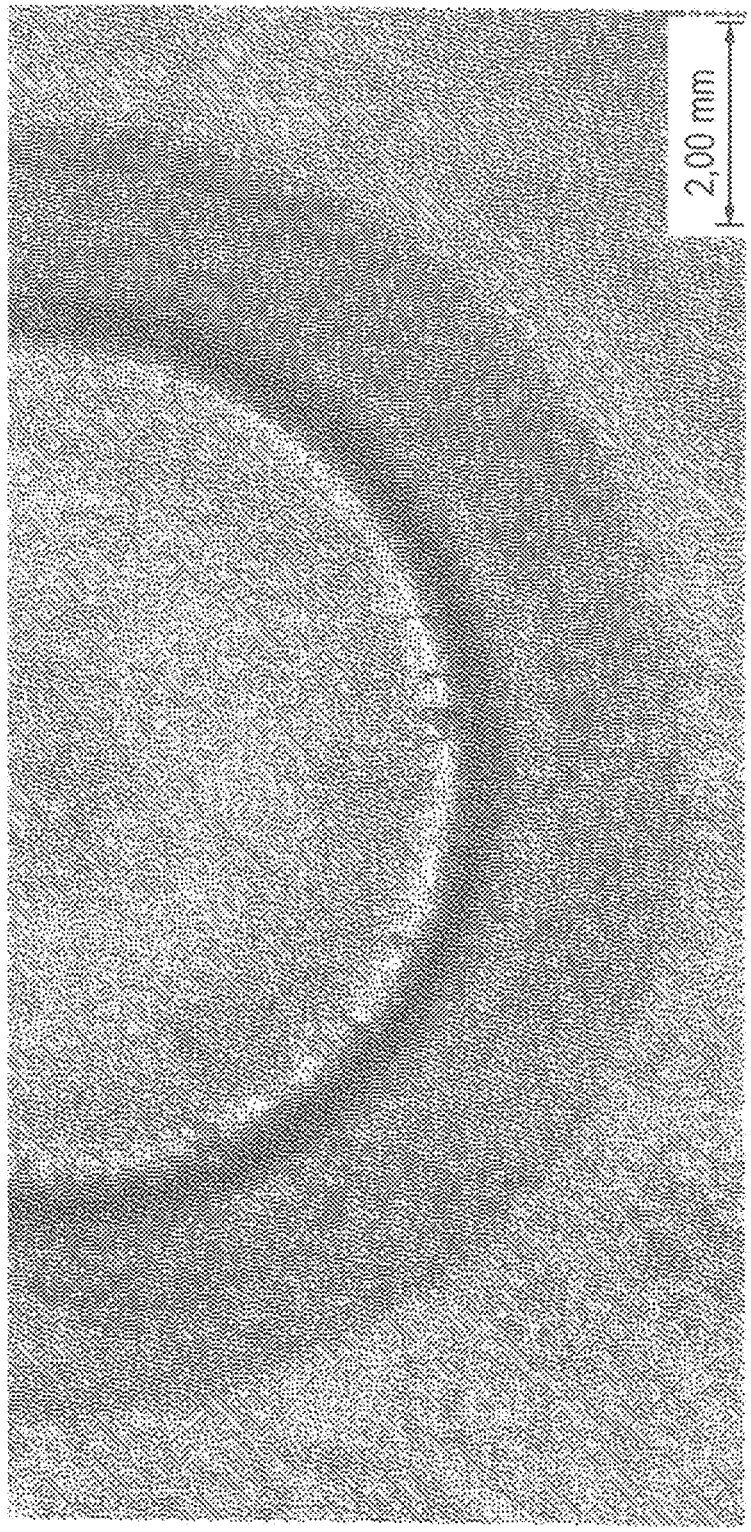
Figure 17C:
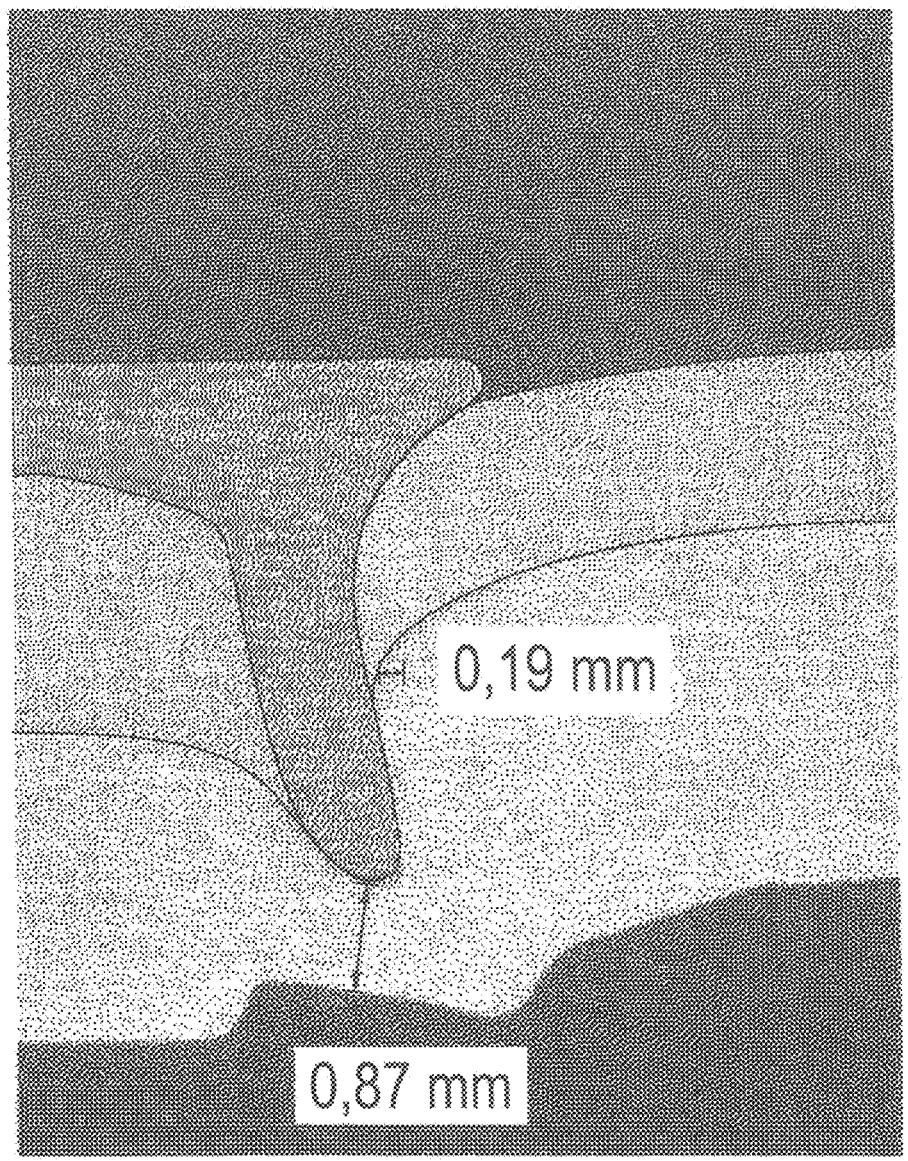
Figure 17D:
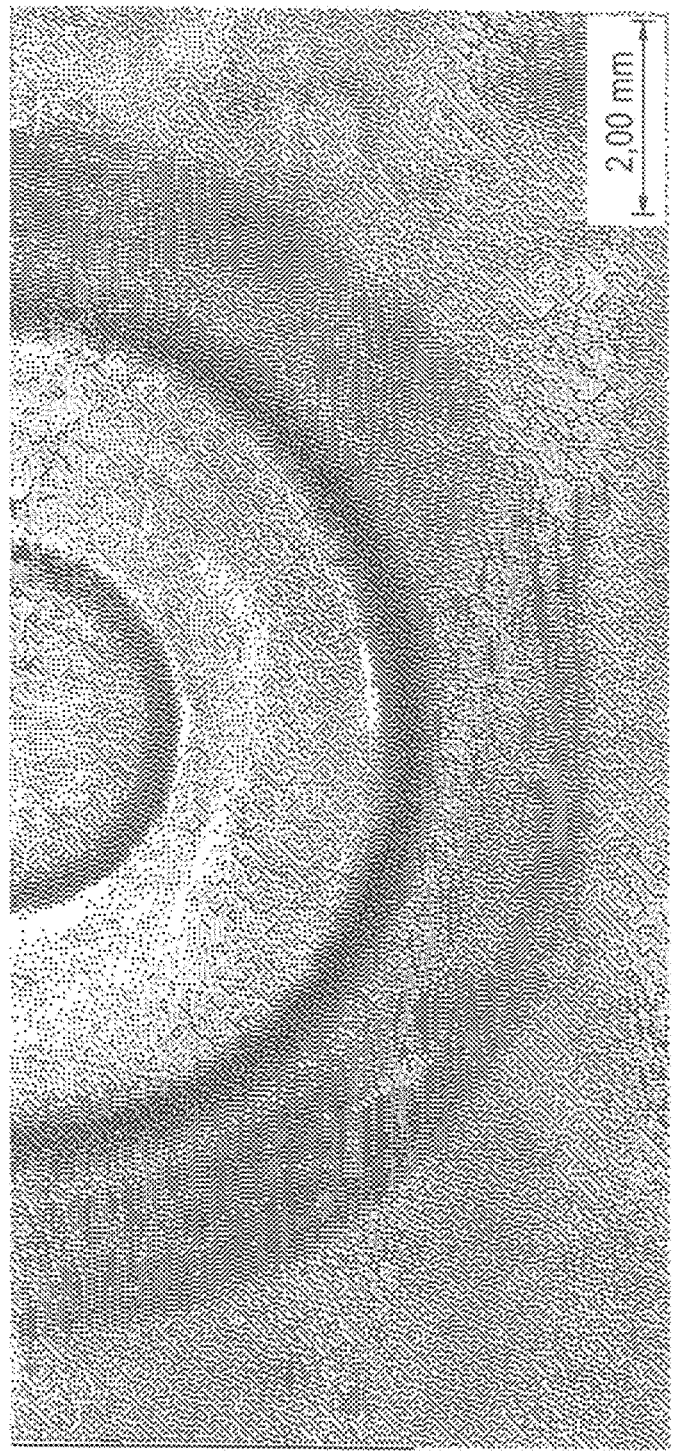
Figure 18:
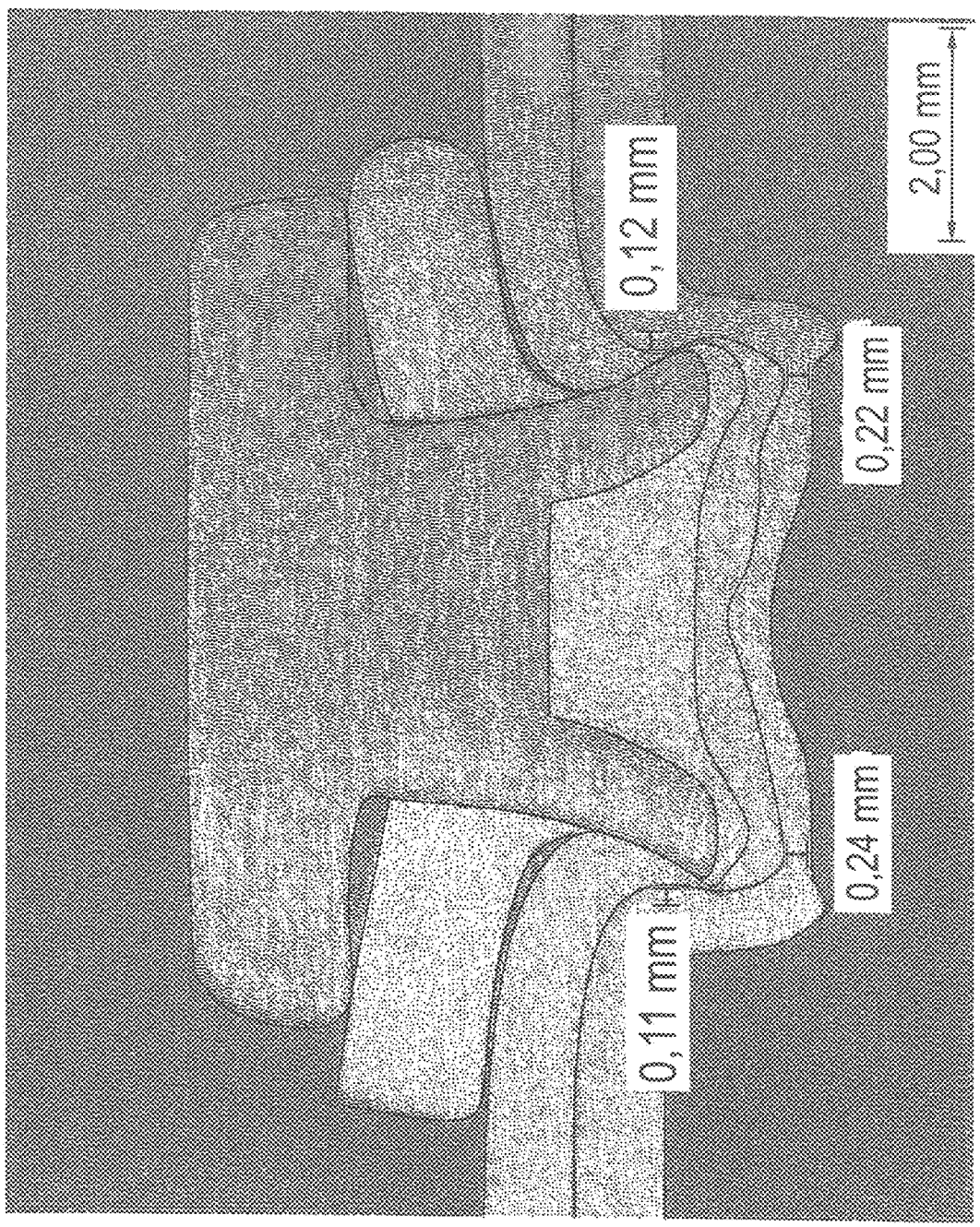
Figure 19:
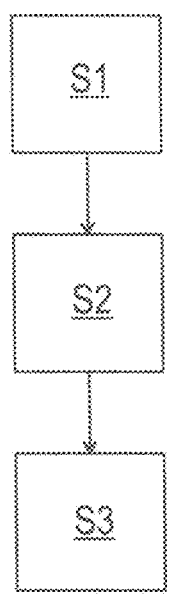

The embodiments of the present disclosure are further described with reference to the accompanying drawing. It shows:

FIG. 1 is a side view of a self-piercing riveting die of the present disclosure, FIG. 2 is a top view of the self-piercing riveting die according to FIG. 1 in joining direction in the recess of the self-piercing riveting die, FIG. 3 is a schematic side-sectional view of the recess of the preferred self-piercing riveting die according to the disclosure parallel to the central axis of the self-piercing riveting die, whereby the recess comprises an annular channel section and a flat die bottom, FIG. 4 is a further schematic view of the self-piercing riveting die according to FIG. 3, in which the different depths of the annular channel section are indicated, FIG. 5 is a further embodiment of the self-piercing riveting die according to the disclosure in a lateral cross-sectional view, FIG. 6 is a top view of another embodiment of the self-piercing riveting die according to the disclosure, FIG. 7 is a lateral cross-sectional view of the recess of the self-piercing riveting die according to FIG. 6, FIG. 8 is a schematic view of a further embodiment of the recess of the self-piercing riveting die with an additional recess in the die bottom, FIG. 9 is a schematic view of the further self-piercing riveting die according to FIG. 8, in which different preferred depths of the annular channel section and the central recess in the die bottom are indicated, FIGS. 10a, 10b, 10c, 10d, 10e are further schematic views of the self-piercing riveting die according to FIG. 8, in which different embodiments of the central recess in the die bottom are schematically illustrated, FIG. 11 is a top view of a further embodiment of the recess of the self-piercing riveting die, FIG. 12 is a side-sectional view of the recess of the preferred self-piercing riveting die according to FIG. 11, FIG. 13 is a top view of another embodiment of the recess of the self-piercing riveting die, FIG. 14 is a side-sectional view of the recess of the self-piercing riveting die according to FIG. 13, FIG. 15 is a schematic view of another self-piercing riveting die, FIG. 16 is a setting device according to DE 10 2009 049 616 with the preferred self-piercing riveting die, FIGS. 17a, 17b, 17c, 17d are photomicrographs and closing heads of the connections established, FIG. 18 is a photomicrograph of a connection established with the self-piercing riveting die according to FIG. 8, and FIG. 19 is a flow diagram of an embodiment of the establishing method of a connection by means of the self-piercing riveting die.

5. DETAILED DESCRIPTION

FIG. 1 shows a self-piercing riveting die 1 in a side view. This die consists of a cylindrically shaped main body 3 and a die foot 5. In this regard, it may be also preferred that the main body is shaped like a cuboid, polyhedrally, elliptically or in another shape. The die foot 5 serves in a known way for arranging and fastening the self-piercing riveting die 1 in a known setting device, as it is shown for example in FIG. 16. It is understood that the present self-piercing riveting die is combinable with known setting devices of any design. For this, the die foot 5 comprises a round cross-section. The latter is one-sided disrupted in his symmetrical contour by a groove 7 for rotation-proof arranging the self-piercing riveting die 1 in a suitable retainer.

In FIG. 2, the self-piercing riveting die of FIG. 1 is shown in a top view. This top view corresponds to a view of the self-piercing riveting die 1 in joining direction F, which runs parallel to the central axis M of the self-piercing riveting die 1. The main body 3 comprises a recess 9 may be arranged rotationally symmetrically to the central axis M and arranged in the upper side 8 of the main body 3. At the upper side 8, the recess 9 has a diameter $D_M$.

The recess 9 is divided rotationally symmetrically in different sections. At the upper side 8, thus the side of the self-piercing riveting die 1 facing a punch of the setting device, the recess 9 starts with a radially outwardly arranged annular demolding section 10. In the axial cross-section of the self-piercing riveting die 1 according to FIG. 5, the annular demolding section 10 is identifiable by the radially outwardly arranged demolding inclination 12. The upper side 8 preferably transitions in a convexly formed section into the demolding inclination 12. According to a further embodiment, the radius $R_{OE}$ (see FIG. 3) is equal 4/100 $D_M$ for the transition from the upper side 8 into the demolding inclination 12. An annular channel 20 follows the demolding section 10 radially inwardly. This is identifiable as a circular arc-shaped lowering 22 in the cross-section of the self-piercing riveting die 1 in FIG. 5. The lowering 22 may transition radially inwardly with a straight-lined and/or circular arc-shaped and/or curvilinearally extending area into a die bottom 30. This die bottom 30 is also arranged rotationally symmetrically around the central axis M and identifiable as plane area 32 in FIG. 5.

In a joining method according to the disclosure, a known setting device (see FIG. 16) is used in combination with the described self-piercing riveting die 1; 1' (see below) for establishing a self-piercing riveting connection and is provided accordingly (Step 1). In order to connect a plurality of components, especially at least a first and a second component, with each other by means of setting a self-piercing rivet, the at least two components are positioned between punch and self-piercing riveting die 1; 1' (Step 2). At this, the self-piercing riveting die 1 according to the invention is used preferably in combination with a die-sided component from brittle or tension-sensitive material, e.g. aluminum alloys from the 7000 series, aluminum die cast materials or magnesium. Further, a material with an elasticity modulus RM<300 MPa, such as aluminum, or with an elasticity modulus RM<1500 MPa, such as well quenched and tempered steel, can be used advantageously for the component facing the die. In general, every material, plastics, reinforced plastics, aluminum, magnesium, alloys of these metals—in general lightweight materials—as well as steel and further known metal alloys is suitable for a punch-sided component, thus a top layer of the connection.

After the components are arranged fittingly between the punch and the self-piercing riveting die 1, the punch sets the self-piercing rivet in the components, whereby a closing head characterizing this connection is formed in the self-piercing riveting die 1 (Step 3). The closing head may represent an impression of the inner design of the recess 9 of the self-piercing riveting die 1. Accordingly, the closing head is characterized by the shape features formed complementary to the inner contour of the recess 9.

During the setting of the self-piercing rivet in the components and the forming of the closing head, the demolding inclination 12 of the annular demolding section 10 may cause a reduction of crack formation in the closing head. In order to support this effect, the upper side 8 of the self-piercing riveting die 1 may transition in a convexly formed step 14 into the demolding inclination 12. In the same way it may be preferred connecting the demolding inclination 12 via a convexly formed step 16 with the lowering 22 or the annular channel section 20. This convexly formed connection between the demolding inclination 12 and the lowering 22 may have a radius $R_{16}$ of approximately 5/100 $D_M$. Further, compared to the concave embodiment shown in FIG. 5, the demolding inclination 12 is formed straight. Accordingly, the demolding inclination 12 and thus the annular demolding section 10, has a frustoconical contour. With a preferred concave/circular arc-shaped form of the demolding section 12, the latter has a radius $R_{ES}$ in the range of $7/10\ D_M \leq R_{ES} \leq 9/10\ D_M$.

FIG. 3 shows a schematic and simplified cross-sectional view of the self-piercing riveting die 1 with demolding section 10, annular channel section 20 and die bottom 30. In FIG. 4, it is emphasized based on the presentation in FIG. 3 that, for establishing an ideal self-piercing riveting connection, preferably a depth $T_{RK}$ of the annular channel section 20 in relation to the upper side 8 is adjusted specifically. The various dashed lines in the lowering 22 illustrate the variation of the depth $T_{RK}$ in a preferred range of $6/100\ D_M \leq T_{RK} \leq 12/100\ D_M$, wherein $D_M$ describes the diameter of the recess 9 at the upper side 8 of the main body 3.

By the specific adjustment of the depth $T_{RK}$ of the annular channel 20 or the lowering 22 especially on the combination with the demolding inclination 12, the mechanical tensions affecting the rivet foot during the joining process are reduced. As a further advantage, it was found that the annular channel section 20 directs the flow of material of the die-sided component radially outwardly. Exactly this flow of material realizes or supports a defined and controlled spreading of the self-piercing rivet in the self-piercing riveting die 1. Thus, by means of the combination and shaping of the flat demolding inclination 12 and the lowering 22 of the annular channel section 20 with the depth $T_{RK}$, the spreading of the self-piercing rivet and the flow of material for forming the closing head is optimized.

Due to the additionally open space created by the annular channel 20 within the recess 9 of the self-piercing riveting die 1, the self-piercing rivet experiences a counterforce by the die bottom 30 at the beginning of the flowing of material in the recess 9. This can be immediately removed by using the radially outwardly arranged open space of the annular channel 20, so that the radially outwardly directed material flowing movement is specifically initiated by the preferred die embodiment. This also may be supported by the die bottom being located above the lowest point of the lowering 22.

The lowering 22 of the annular channel section 20 may have a radius $R_S$ in the range of $8.2/1000\ D_M \leq R_S \leq 8.2/100\ D_M$. Thereby, $D_M$ describes the diameter of the recess 9 (see above).

The demolding inclination 12 preferably includes the angle $\alpha$ with the upper side 8 of the main body 3, as it is shown in FIGS. 3 and 5. According to the radially inwardly directed inclination of the demolding inclination 12, the angle has a size in the range of $5° \leq \alpha \leq 45°$, preferably $25° \leq \alpha \leq 45°$ or $5° \leq \alpha \leq 25°$. Additionally, the angle $\alpha = 18°$ has been shown to be preferred according to the invention. Especially by this flat arrangement of the demolding inclination 12, which causes a considerably different flowing of material in the recess 9 than a perpendicular or an almost perpendicular side wall of the recess 9, an improved forming of a closing head and a reduced crack formation is achieved compared to the prior art. In this regard, it is also preferred to realize a convex transition between the upper side of the die and the demolding inclination with a radius of R=0.5 mm.

In order to ensure an unrestricted flow of material in the recess 9 during the joining process, the transition from the lowering 22 into the die bottom 32 may be formed as a convex step 24. In this way, it is prevented that flowing material of the die-sided component is jammed within the recess 9. This also applies for the above-described preferred steps 14 and 16. Additionally, this convex step 24 creates a flowing and thereby barrier-free transition from the die bottom 32 into the annular channel 20 or the lowering 22. This convex step 24 may support a controlled sliding and thus spreading of the rivet foot of the self-piercing rivet during the joining process. For this purpose, a radius $R_{24}$ of the convex step 24 is adjustable in the range of $98/1000\ D_M \leq R_{24} \leq 98/100\ D_M$.

It may be further preferred that the annular channel section 10 has a diameter D20 as it is shown in FIG. 4. By a suitable choice of the diameter D20, the spreading of the die foot is specifically controlled. In this way, the diameter D20 is adjusted according to the head diameter of the self-piercing rivet to be set, so that a spreading of the rivet foot in radial direction over the outer side of the rivet head is prevented or at least restricted as far as possible. Accordingly, $D_{20}$=7.75 mm large for a self-piercing rivet with a head diameter of 7.75 mm or $D_{20}$=5.5 mm large for a self-piercing rivet with a head diameter of 5.5 mm.

It may be further preferred that the circular arc-shaped lowering 22 transitions tangentially into the both-sidedly adjacent, convexly formed steps 16 and 24. These transition points are indicated with the reference sign UP in FIG. 5. The radial distance $A_{UP}$ between adjacent transition points UP defines the radial width of the lowering 22. The width may be in the range of $3/100\ D_M \leq A_{UP} \leq 20/100\ D_M$. A further embodiment of the self-piercing riveting die 1 is shown in the FIGS. 6 and 7. Compared to FIG. 5, the lowering 22 was formed with a larger radius $R_{ES}$ and with a larger depth $T_{RK}$ here.

FIG. 8 schematically shows another embodiment of the present disclosure, which is described more detailed in the FIGS. 11 to 14 by means of further embodiments. As it can be seen in FIG. 8, the lowering 22 rises radially inwardly up to the height of the die bottom 32. In addition to the above-described features of the self-piercing riveting die 1, which apply in the same way for the embodiments of FIGS. 8 to 14, a centered recess is provided in the die bottom 32. This is arranged symmetrically around the central axis M. This recess 34 receives displaced material of the die-sided component, whereby a compressing of the self-piercing rivet is avoided and the latter is additionally relieved.

For this, a depth $T_A$ of the recess 34 is specifically adjustable to the joining task, which is illustrated by FIG. 9 in analogy to the descriptions and depictions in FIG. 4. The recess 34 may be provided with a depth $T_A$ in the range of $2/100\ D_M \leq T_A \leq 8/100\ D_M$ and a diameter $D_A$ in the range of $15/100\ D_M \leq D_A \leq 35/100\ D_M$. Thereby, the diameter $D_A$ may be determined at the level of the die bottom 32.

According to FIG. 10, it is furthermore preferred to use the recess 34 in different shape for influencing the flow of material within the recess 9. Therefore, the recess 34 may be cylindrically shaped (a). In another embodiment, the cylindrically shaped recess 34 is conically tapered in the depth (d) or has the form of a truncated cone (e). According to a further embodiment, a bottom of the recess 34 is formed with a circumferential (umlaufend) annular channel and a central rise (b) or a central rise solely (c). Initially independent from the shape of the recess 34, the central rise allows an easier material displacement in and/or from the joining area in form of a material reception compared to a material displacement radially outwardly with regard to the joining direction of the self-piercing rivet. In order to effectively use this function, the depth $T_A$ of the recess is adjusted to a thickness of the die-sided material layer. In this context, with increasing thickness of the die-sided material layer, a largerly adjusted depth $T_A$ of the recess is used. With regard to the above discussed annular channel, the general relation applies with decreasing ductility.

FIG. 15 shows a further embodiment of the present disclosure. In regard of the schematic cross-section shown in FIG. 15, this self-piercing riveting die 1' is characterized by the following features. The demolding inclination 12' of the demolding section 10' includes with the upper side 8' of the self-piercing riveting die 1' an angle $\alpha'$ in the range of $10°\leq\alpha'\leq85°$. The demolding inclination 12' transitions radially inwardly into a circular arc-shaped lowering 22' of the annular channel section 20' with a radius $R_S'$ in a range of $1/100\ D_M \leq R_S' \leq 7/100\ D_M$. In addition, the circular arc-shaped lowering 22' rises via an at least first step 36 circular arc-shaped to the die bottom 32. Due to the specific combination of the annular channel section 20' and the gradual rise of the die bottom or the rise from the lowering 22' to the highest point of the die bottom 32', a stronger lateral compressing of the rivet foot is achieved in addition to a consistent flow of material for reduction of the crack formation. This increased spreading achieves a larger undercut contrary to the joining direction of the set self-piercing rivet. Since the connection of the components is not weakened by crack formation and the enhanced undercut benefits the lifespan of the connection and its strength, this self-piercing riveting geometry leads to an increased connection quality. According to different embodiments of the preferred self-piercing riveting die 1', the die bottom 32' comprises a centrally arranged, rotationally symmetric rise 40. This is formed preferably curvilinearally/circular arc-shaped or semi-elliptically or cylindrically for the specific spreading of the self-piercing rivet and for increasing the undercut.

FIG. 16 schematically shows a known setting device in combination with the self-piercing riveting die 1; 1' according to the disclosure. Connections established therewith are shown exemplary by means of photomicrographs in FIG. 17. FIG. 17a shows a self-piercing riveting connection, which was established with a self-piercing riveting die 1 according to FIG. 5. FIG. 17b shows the closing head of this connection. FIG. 17c shows a self-piercing riveting connection, which was established with a self-piercing riveting die 1 with a centered recess 34. The closing head of the connection is shown in FIG. 17d. FIG. 18 shows the photomicrograph of a connection, which was established by the self-piercing riveting die 1' according to FIG. 15.

Exemplary preferred die geometries according to the disclosure are described in the following based on concrete, above-discussed geometry data of self-piercing riveting dies. In order to categorize the die form in combination with the following geometry data, reference is made to the above-discussed Figures:

Example 1

A die form similar to FIG. 3 with the following geometry data
$D_M$=12.2 mm
$D_{20}$=8.395 mm
$\alpha$=18°
$R_{OE}$=0.5 mm
$R_{ES}$=10.4 mm
$R_S$=0.2 mm
$R_{24}$=11.17 mm
$R_{16}$=0.6 mm
$T_{RK}$=0.9 mm

Example 2

A die form similar to FIG. 3 with the following geometry data
$D_M$=12.2 mm
$D_{20}$=7.3 mm
$\alpha$=18°
$R_{OE}$=0.5 mm
$R_{ES}$=10.4 mm
$R_S$=0.8 mm
$R_{24}$=1.44 mm
$R_{16}$=0.6 mm
$T_{RK}$=1.3 mm

Example 3

A die form similar to FIG. 9 with the following geometry data
$D_M$=12.2 mm
$D_{20}$=8.395 mm
$\alpha$=18°
$R_{OE}$=0.5 mm
$R_{ES}$=10.4 mm
$R_S$=0.2 mm
$R_{24}$=11.17 mm
$R_{16}$=0.6 mm
$T_{RK}$=0.9 mm
$D_A$=3.6 mm
$T_A$=0.9 mm

Example 4

A die form similar to FIG. 9 with the following geometry data
$D_M$=12.2 mm
$D_{20}$=8.09 mm
$\alpha$=18°
$R_{OE}$=0.5 mm
$R_{ES}$=10.4 mm
$R_S$=0.44 mm
$R_{24}$=10 mm
$R_{16}$=0.6 mm
$T_{RK}$=1.05 mm
$D_A$=3.6 mm
$T_A$=0.5 mm

Example 5

A die form similar to FIG. 9 with the following geometry data
$D_M$=12.2 mm
$D_{20}$=7.77 mm
$\alpha$=18°
$R_{OE}$=0.5 mm
$R_{ES}$=10.4 mm
$R_S$=0.6 mm
$R_{24}$=3 mm
$R_{16}$=0.6 mm
$T_{RK}$=1.15 mm
$D_A$=3.7 mm
$T_A$=0.3 mm

Example 6

A die form similar to FIG. 9 with the following geometry data
$D_M$=12.2 mm
$D_{20}$=7.28 mm
$\alpha$=18°
$R_{OE}$=0.5 mm
$R_{ES}$=10.4 mm
$R_S$=0.83 mm
$R_{24}$=1.44 mm
$R_{16}$=0.6 mm
$T_{RK}$=1.3 mm
$D_A$=3.6 mm
$T_A$=0.9 mm

Example 7

A die form similar to FIG. 9 with the following geometry data
$D_M$=12.2 mm
$D_{20}$=7.57 mm
$\alpha$=18°
$R_{OE}$=0.59 mm
$R_{ES}$=∞→realized as inclined straight line
$R_S$=0.834 mm
$R_{24}$=11.17 mm
$R_{16}$=0.6 mm
$T_{RK}$=1.3 mm
$D_A$=3.5 mm
$T_A$=0.7 mm

Example 8

A die form similar to FIG. 10 e) with the following geometry data
$D_M$=12.2 mm
$D_{20}$=8.18 mm
$\alpha$=18°
$R_{OE}$=0.59 mm
$R_{ES}$=∞→realized as inclined straight line
$R_S$=0.7 mm
$R_{24}$=∞→realized as inclined straight line
$R_{16}$=0.6 mm
$T_{RK}$=1.3 mm
$D_A$=4.87 mm at the opening side of the recess 34
$D_A$=2.86 mm at the bottom of the recess 34
$T_A$=0.47 mm

Example 9

A die form similar to FIG. 10 e) with the following geometry data
$D_M$=12.2 mm
$D_{20}$=7.53 mm
$\alpha$=18°
$R_{OE}$=0.59 mm
$R_{ES}$=∞→realized as inclined straight line $R_S$=0.83 mm
$R_{24}$=∞→realized as inclined straight line
$R_{16}$=0.6 mm
$T_{RK}$=1.3 mm
$D_A$=4.94 mm at the opening side of the recess 34
$D_A$=2.86 mm at the bottom of the recess 34
$T_A$=0.49 mm

The invention claimed is:

1. Self-piercing riveting die for a setting device, by which a self-piercing riveting connection in a plurality of components is establishable by forming a closing head, comprising the following features:
   a. a main body with an upper side and a recess formed therein and being arranged rotationally symmetrically to the central axis of the self-piercing riveting die, the recess having a diameter $D_M$ at the upper side,
   b. the recess comprises an annular demolding section arranged radially outwardly, an annular channel section subsequent thereto and a centrally arranged die bottom, wherein
   c. in a cross section of the self-piercing riveting die extending parallel to the central axis
      c1. a demolding inclination of the demolding section encloses with the upper side of the self-piercing riveting die an angle $\alpha$ in the range of $5° \leq \alpha \leq 45°$,
      c2. the demolding inclination transitions radially inwardly via a step into a circular arc-shaped lowering of the annular channel section with a radius $R_S$ in a range of $8.2/1000\ D_M \leq R_S \leq 8.2/100\ D_M$, and
      c3. radially inwardly the circular arc-shaped lowering rises straight-lined or circular arc-shaped or curvilinearally to the die bottom.

2. Self-piercing riveting die according to claim 1, the demolding inclination of which is formed straight-lined or concave-curvilinearly with a radius $R_{ES}$ in the range of $7/10\ D_M \leq R_{ES} \leq 9/10\ D_M$.

3. Self-piercing riveting die according to claim 1, in which the circular arc-shaped lowering has a maximal depth $T_{RK}$ (in the range of $6/100\ D_M \leq T_{RK} \leq 12/100\ D_M$ regarding the upper side.

4. Self-piercing riveting die according to claim 1, in which the demolding inclination transitions in a convex step into the lowering of the annular channel section.

5. Self-piercing riveting die according to claim 1, in which the lowering of the annular channel section transitions in a convex step into the die bottom.

6. Self-piercing riveting die according to claim 5, in which the demolding inclination transitions in a convex step into the lowering of the annular channel section and in which the circular arc-shaped lowering transitions in two adjacent transition points tangentially into the adjacent convex steps and a radial distance $A_{UP}$ between the adjacent transition points UP defines a width of the circular arc-shaped lowering of the annular channel section.

7. Self-piercing riveting die according to claim 6, in which the width of the circular arc-shaped lowering is preferably in the range of $3/100\ D_M \leq A_{UP} \leq 20/100\ D_M$.

8. Self-piercing riveting die according to claim 1, further having a centered recess in the die bottom with a depth $T_A$ in the range of $2/100\ D_M \leq T_A \leq 8/100\ D_M$.

9. Self-piercing riveting die according to claim 8, the recess of which is cylindrically formed or conically tapered in the direction of the maximal depth $T_A$.

10. A setting device with a self-piercing riveting die according to claim 1.

11. A connection between an at least first component and a second component by a self-piercing rivet and a self-piercing riveting die according to claim 1, so that a closing head qualifying the connection has complementary shape features with regard to the self-piercing riveting die.

12. Connection according to claim 11, in which the second component adjacent to the closing head consists of a tension-sensitive or brittle material.

13. Self-piercing riveting method for establishing a connection in at least a first and a second component by a self-piercing rivet, a setting device and a self-piercing riveting die according to claim 1, comprising the following steps:
   a. providing the self-piercing riveting die below the punch of the setting device,
   b. arranging the first and the second component between the self-piercing riveting die and the punch and
   c. setting a self-piercing rivet in the first and the second component while simultaneously forming a closing head, which shows shape features complementary to the inner contour of the self-piercing riveting die.

14. Self-piercing riveting die according to claim 2, in which the circular arc-shaped lowering has a maximal depth $T_{RK}$ in the range of $6/100\ D_M \leq T_{RK} \leq 12/100\ D_M$ regarding the upper side.

15. Self-piercing riveting die according to claim 2, in which the demolding inclination transitions in a convex step into the lowering of the annular channel section.

16. Self-piercing riveting die according to claim 2, in which the lowering of the annular channel section transitions in a convex step into the die bottom.

17. Self-piercing riveting die according to claim 16, in which the demolding inclination transitions in a convex step into the lowering of the annular channel section and in which the circular arc-shaped lowering transitions in two adjacent transition points tangentially into the adjacent convex steps and a radial distance $A_{UP}$ between the adjacent transition points UP defines a width of the circular arc-shaped lowering of the annular channel section.

18. Self-piercing riveting die according to claim 17, in which the width of the circular arc-shaped lowering is in the range of $3/100\ D_M \leq A_{UP} \leq 20/100\ D_M$.

19. Self-piercing riveting die according to claim 2, further having a centered recess in the die bottom with a depth $T_A$ in the range of $2/100\ D_M \leq T_A \leq 8/100\ D_M$.

20. Self-piercing riveting die according to claim 8, with a preferred diameter $D_A$ in the range of $15/100\ D_M \leq D_A \leq 35/100\ D_M$.

* * * * *